United States Patent [19]

Kudza et al.

[11] 3,928,243

[45] Dec. 23, 1975

[54] THICK FILM RESISTOR PASTE CONTAINING TANTALA GLASS

[75] Inventors: Thomas M. Kudza, Swartz Creek; Raymond E. Schwyn, Flint; Morris Berg, Grand Blanc, all of Mich.

[73] Assignee: General Motors Corporation, Detroit, Mich.

[22] Filed: July 3, 1974

[21] Appl. No.: 485,337

[52] U.S. Cl. .................. 252/514; 252/518; 106/53
[51] Int. Cl.² ............................................. H01B 1/02
[58] Field of Search ....... 252/514, 518, 512; 106/53

[56] References Cited
UNITED STATES PATENTS

| | | | |
|---|---|---|---|
| 3,252,831 | 5/1966 | Ragan | 252/514 |
| 3,553,109 | 1/1971 | Hoffman | 252/514 |
| 3,560,410 | 2/1971 | Schubert | 252/518 |
| 3,583,931 | 6/1971 | Bouchard | 252/520 |
| 3,637,530 | 1/1972 | Casale et al. | 252/514 |
| 3,639,274 | 2/1972 | Brandt et al. | 252/514 |
| 3,681,261 | 8/1972 | Mason | 252/514 |

*Primary Examiner*—Benjamin R. Padgett
*Assistant Examiner*—Josephine Lloyd
*Attorney, Agent, or Firm*—Sidney Carter

[57] ABSTRACT

Resistor compositions yielding smooth surface resistor films of up to about 25,000 ohms per square per mil thickness which is little affected by humidity and exposure to peak firing temperature and has low TCR values, comprising relatively small amounts of ruthenia, antimony or bismuth trioxides and tantala, and relatively large amounts of silver, lead-borosilicate glass and conducting tantala glass.

9 Claims, No Drawings

THICK FILM RESISTOR PASTE CONTAINING TANTALA GLASS

Precious metal resistor compositions for use in production of fired electrical resistors have become widespread in their use. Such compositions are typically based on the use of noble metals such as silver, gold, palladium platinum, iridium, rhodium and ruthenium together with a glassy binder which is in the non-conducting type. Typical of such compositions are those shown in Faber, Sr., U.S. Pat. No. 3,304,199, Kim U.S. Pat. No. 3,352,797, Hoffman U.S. Pat. No. 3,553,109, Schubert U.S. Pat. No. 3,560,410 and Bouchard U.S. Pat. No. 3,583,931. Since the cost of these metals is extremely high as compared to the cost of silver, it is highly desirable to develop compositions in which silver is used with the quantity of the other noble metals held to a minimum. It is also desirable to be able to closely and simply control the resistance of the compositions formulated.

In accordance with our invention, we have developed resistor compositions which use relatively small quantities of ruthenium and tantalum and in which the range of resistance in the compounds is achieved by varying the quantity of ruthenia and tantala glass used. More particularly, we have found that compositions including substantially constant amounts of antimony trioxide, silver, tantala and lead borosilicate glass, may be formulated with resistivities of from about 500 ohms/square/mil to about 25,000 ohms/square/mil by simply varying the amount of ruthenia and tantala glass added to the base mixture.

It is therefore an object of our invention to provide a series of resistor compositions wherein a plurality of basic ingredients remains substantially constant and in which the resistance value is achieved by varying the amounts of a conducting glass and ruthenia added thereto.

It is a further object of our invention to provide resistor compositions using a minimum of the relatively expensive materials such as the noble metals.

We have discovered that resistor compositions having resistivities of up to about 25,000 ohms/square/mil having relatively low TCR values (temperature coefficient of resistance) may be obtained by using not only the metallic phase as the conductor material, but also the glass phase. Whereas we use a lead borosilicate glass frit in our compositions, we also use such frit which has been modified by the addition thereto of tantalum oxide to give this portion of the glass electronic conducting properties. More particularly, the conducting glass is obtained by fritting the lead borosilicate glass with tantalum oxide in the weight percent ratio of about 67% glass to 33% tantala.

The compositions of our invention for obtaining resistivities of up to about 25,000 ohms/square/mil are obtained by using the following materials:

| | |
|---|---|
| $RuO_2$ | — about 7 to 11 parts by weight |
| $Sb_2O_3$ | — about 2 parts by weight |
| Ag | — about 20 parts by weight |
| $Ta_2O_5$ | — about 4 parts by weight |
| lead-borosilicate glass | — about 20 parts by weight |
| tantala glass | — about 43 to 47 parts by weight |

We have found that both the tantala and the tantala glass serve to control the TCR of the composition by shifting it to the negative as the amount increases. We maintain the tantala in fixed amount since it serves as a flux, the amount of tantala glass being used, preferably, as the variant to achieve the desired control. We have also found that bismuth trioxide may be used as an equivalent for antimony trioxide.

The following examples give the data relative to composition as well as electrical properties and serve to exemplify our invention, references to sensitivity relating to resistivity:

| | (1) | (2) | (3) |
|---|---|---|---|
| $RuO_2$ | 11 | 9 | 7 |
| $Sb_2O_3$ | 2 | 2 | 2 |
| Ag | 20 | 20 | 20 |
| $Ta_2O_5$ | 4 | 4 | 4 |
| Lead borosilicate glass | 20 | 20 | 20 |
| Ta glass | 43 | 45 | 47 |
| Resistivity (ohms/square/mil) | 500 | 2,000 | 25,000 |
| T.C.R. – ppm/deg. C (−55 to +125° C) | 229/164 | 128/63 | −156/−242 |
| Sensitivity to firing zone dew point | none | none | none above 20° F |
| Sensitivity at peak temp. (± 3 minute exposure time) | less than ± 20% | less than ± 20% | 35% (+ 3 min.); less than 20% (− 3 min.) |
| Sensitivity to peak firing temperature | very little (760–780° C) | ditto (1) | ditto (1) |
| | less than 2%/° C (780–840° C) | ditto (1) | ditto (1) |

The glass used in our invention is preferably a lead-borosilicate glass as, for example, a glass with constituents in the following ranges by weight percent:

| | | |
|---|---|---|
| $SiO_2$ | 24–32, | 28 preferred |
| $Al_2O_3$ | 0– 5, | 3 preferred |
| PbO | 48–66, | 57 preferred |
| $B_2O_3$ | 10–14, | 12 preferred |

The preferred mixture is an example of a commercial glass binder which is suitable for the compositions of our inventions and is sold by Drakenfeld Division of Hercules, Inc. under the label E-1313. Any conventional lead-borosilicate glass commercially available should serve.

As noted above, the conducting glass phase of our compositions is made by refritting the borosilicate glass together with tantala, the amounts being about 33 weight percent tantalum oxide to 67% glass. Fritting is accomplished in the conventional manner and the new glass is dried, ground, and screened through a 325 mesh.

In preparing the resistor inks of our invention, the generally conventional steps known in the art are employed. More particularly, 1. weigh constituents on analytical balance;
2. place in ball mill half filled with balls, cover balls with alcohol (Solox) and mill for about two hours;
3. wash contents of mill into evaporating dish through a 250 mesh screen using alcohol;
4. allow to settle, decant clear alcohol and evaporate remaining alcohol;
5. blend twenty percent (by weight) organic silk screen medium, i.e., Reusche squeegee medium No. 163-C containing ethyl cellulose and dibutylcarbitol, with dry powder;
6. mill on three-roll mill until uniformly blended;
7. add dibutylcarbitol to reduce viscosity to approximately 200,000 centipoise (Brookfield RVT, spindle No. 7, 10 rpm, 25°C).

Resistor films of about 1.0 mil dry print thickness are obtained using the compositions of our invention by silk screen printing techniques well known in the art. The printed ink is dried at about 100°C for about 20–30 minutes prior to firing which is accomplished at a peak firing temperature of about 800°C over a 50 minute cycle. The properties of the resulting film resistors are entirely satisfactory both electrically and physically as noted above.

While we have described our invention in terms of its preferred embodiments, equivalents will occur to those skilled in the art and are within the scope of our invention as defined in the following claims.

What is claimed is:

1. A resistor composition suitable for electrical resistors comprising a mixture in relatively small amounts of ruthenia, antimony or bismuth trioxide and tantalum pentoxide, together with relatively large amounts of silver, non-conducting lead-borosilicate glass and conducting tantala glass.

2. A resistor composition as in claim 1 wherein the materials used expressed in parts by weight, are ruthenia about 7–11, antimony trioxide about 2, silver about 20, tantala about 4, lead-borosilicate glass about 20, and tantala glass about 43 to 47.

3. A resistor composition as in claim 2 wherein ruthenia is present in an amount of about 11 parts of weight and tantala glass about 43 parts by weight.

4. A resistor composition as in claim 2 wherein ruthenia is present in an amount of about 9 parts by weight and tantala glass about 45 parts by weight.

5. A resistor composition as in claim 2 wherein ruthenia is present in an amount of about 7 parts by weight and tantala glass about 47 parts by weight.

6. An electrical resistor having a glass phase consisting of about 20 parts by weight lead-borosilicate glass and about 43 to 47 parts by weight tantala glass, about 7–11 parts by weight ruthenia, about 2 parts by weight antimony trioxide, about 20 parts by weight silver and about 4 parts by weight tantala.

7. An electrical resistor as in claim 6 wherein ruthenia is present in an amount of about 11 parts by weight and tantala glass about 43 parts by weight.

8. An electrical resistor as in claim 6 wherein ruthenia is present in an amount of about 9 parts by weight and tantala glass about 45 parts by weight.

9. An electrical resistor as in claim 6 wherein ruthenia is present in an amount of about 7 parts by weight and tantala glass about 47 parts by weight.

* * * * *